United States Patent [19]

Erickson

[11] Patent Number: 4,932,295
[45] Date of Patent: Jun. 12, 1990

[54] AUTOMATIC CLAMPING UNIT FOR RECEIVING AND HOLDING A TOOL HOLDER

[75] Inventor: Robert A. Erickson, Raleigh, N.C.
[73] Assignee: Kennametal Inc., Latrobe, Pa.
[21] Appl. No.: 238,718
[22] Filed: Aug. 30, 1988
[51] Int. Cl.$^5$ .............................................. B23B 29/04
[52] U.S. Cl. ........................................ 82/160; 82/158; 407/101; 409/233
[58] Field of Search ......................... 82/160, 158, 159; 407/46, 47, 101, 102, 105; 409/233, 232, 334

[56] References Cited

U.S. PATENT DOCUMENTS 4,680,999  7/1987  Kojima ................................... 82/160
4,708,040 11/1987  Erickson ............................. 407/101

Primary Examiner—Frederick R. Schmidt
Assistant Examiner—Blynn Shideler
Attorney, Agent, or Firm—Thomas R. Trempus

[57] ABSTRACT

The present invention relates to an automatic clamping unit of the type having a spring loaded lock rod that is movable between an unlocked and locked position. A pair of locking balls are confined about the locking rod and are operative to move outwardly for engagement with the shank of a tool holder in response to the locking rod moving from the unlocked position to the locked position. The lock rod of the present invention includes a variable sloped ramp for engagement with each locking ball. As each locking ball moves along the variable sloped locking ramp, the mechanical advantage applied to the locking balls through the ramp varies due to the variation in slope. Each locking ramp is particularly configured such that the resultant locking load exerted by the locking balls against the shank of the tool holder is relatively constant although the position of the locking rod and the force being applied to the locking rod varies.

27 Claims, 2 Drawing Sheets

AUTOMATIC CLAMPING UNIT FOR RECEIVING AND HOLDING A TOOL HOLDER

FIELD OF THE INVENTION

The present invention relates to automatic clamping units for receiving and holding tool holders, and more particularly to automatic clamping units of the type including a movable locking rod that utilizes a spring or springs to move the same from an unlocked position to a locked position.

BACKGROUND OF THE INVENTION

Automatic tool holder clamping units are widely used today. One of the most versitile and efficient clamping unit designs entails the utilization of a movable lock rod. In such a design, the lock rod, through a locking ramp formed on the surface thereof engages a pair of locking balls. As the locking rod is moved from an unlocked position to a locked position, the locking ramp engages the locking balls and urges them outwardly where they project through selected apertures formed in the clamping unit and engage the shank portion of the tool holder. The locking rod is loaded such that it transmits through the locking balls a radial or perpendicular (relative to the longitudinal axis of the locking rod) locking load against the shank of the tool holder.

There are basically two types of automatic clamping units that utilize this lock rod concept. First, there is the torque nut design which utilizes a nut threaded onto a draw rod that is connected to or forms a part of the lock rod. The particular load placed on the lock rod can be varied and particularly set by the amount of torque applied to the nut.

The second type of lock rod automatic clamping unit is the spring type. This approach utilizes a series of disk springs that form an integral part of the clamping unit and which are disposed such that they engage the lock rod and bias the same towards a locked position.

The disk spring or variable force-type clamping unit is a very popular and desirable clamping unit because of its simplicity. However, it is more difficult to control the resultant locking forces in the disk spring-type automatic clamping unit. This is because the position that the lock rod assumes in the lock position may vary due to manufacturing tolerances. Because of the nature of springs, the force applied to the lock rod and ultimately transferred outwardly for purposes of locking will vary due to the position that the lock rod assumes in the locked position. This is particularly evident in high mechanical advantage designs.

Presently, the locking angle of the locking ramp formed on the lock rod has been formed by a surface inclined at a set angle. Therefore, the mechanical advantage applied by the locking rod is constant throughout the stroke of the locking rod. Therefore, the resultant outward locking force exerted by the locking elements or balls engaged with the constant angle locking ramp will vary depending on the position of the locking rod and the forces applied against the locking rod by the disk springs. Obviously, a significant variation in locking forces affects the performance of the cutting tool and the tool holder.

SUMMARY AND OBJECTS OF THE INVENTION

The present invention entails an automatic clamping unit that is provided with means for varying the mechanical advantage applied to the locking elements as the locking rod moves from its unlocked to locked position. In the case of the present invention, the locking rod is provided with a variable sloped locking ramp for each locking element or ball. The locking ramp is so configured that the effected angle of the locking ramp changes along it run. Effectively, this varies the mechanical advantage applied against and to the locking balls so as to produce a relatively constant resultant locking load irrespective of the particular position of the locking rod within its stroke or the load being applied to the locking rod by the springs. The net result is that the tool holder is secured to the clamping unit by a relatively constant, appropriate locking force that is selected to optimize the performance of the tool holder and it cutting tool.

It is therefore an object of the present invention to provide an automatic clamping unit for receiving and holding a tool holder that is capable of varying the mechanical advantage applied to lock the tool holder within the clamping unit.

Another object of the present invention is to provide an automatic clamping unit that includes a lock rod biased towards a locked position by a variable force means wherein the lock rod is provided with a variable sloped locking ramp configured so as to yield a relatively constant resultant locking force for numerous points along the locking ramp.

Still a further object of the present invention resides in the provision of an improved locking mechanism for a spring loaded tool holder clamping device wherein the locking mechanism is designed to vary the mechanical advantage applied to adjacent locking elements relative to the position of the lock rod during its unlocking to locking stroke.

Other objects and advantages of the present invention will become apparent and obvious from a study of the following description and the accompanying drawings which are merely illustrative of such invention.

DETAILED DESCRIPTION OF THE INVENTION

Figure 1:
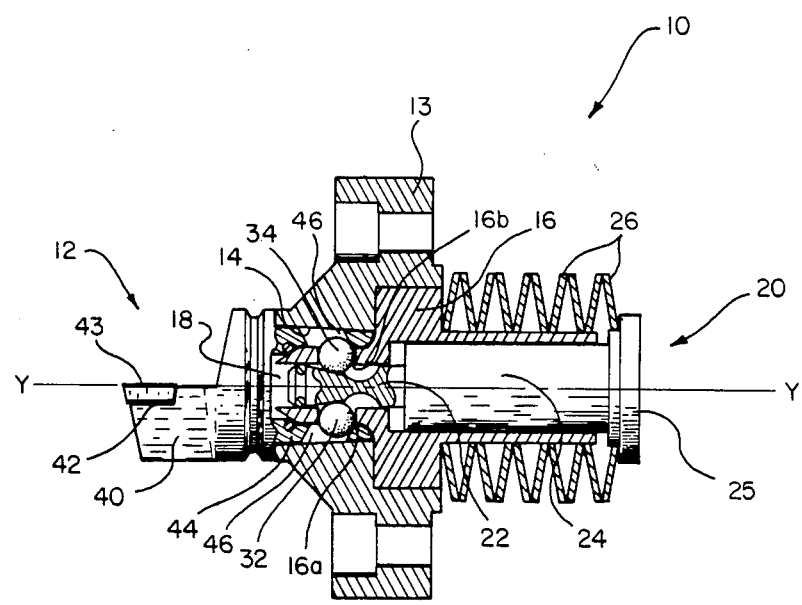
FIG. 1 is a longitudinal sectional view of the spring loaded clamping unit of the present invention shown holding a tool holder.

With further reference to the drawings, the automatic clamping unit of the present invention is shown therein and indicated generally by the numeral 10. Clamping unit 10 is designed to receive and hold a conventional tool holder indicated generally by the numeral 12.

Viewing clamping unit 10 it is seen that the same comprises a support structure or member 13 that includes a bore 14. Secured within the bore 14 of support member 13 is a stub or inner fixed cannister 16. Support member 13 and the inner fixed cannister 16 form an integral assembly. Circumferentially spaced about the forward end of stub or fixed cannister 16 is a pair of apertures 16a and 16b. Defined within stub or cannister 16 is an elongated passageway 18.

Movably mounted within passageway 18 is a locking rod indicated generally by the numeral 20. Locking rod 20 includes a forward locking portion 22 and a rear extending portion 24. As will be appreciated from subsequent portions of this disclosure, locking rod 20 is movable fore and aftly within passageway 18 between a rearwardly disposed unlocking position and a forwardly disposed locking position (FIG. 1).

Locking rod 20 is biased towards the locked position by a conventional spring assembly 26 disposed around the exterior of the rear portion of fixed cannister 16. Springs 26 are essentially compressed and held between a shoulder formed about the fixed cannister 16 and an end plate or stop 25 formed about the rear end of locking rod 20.

Figure 2:
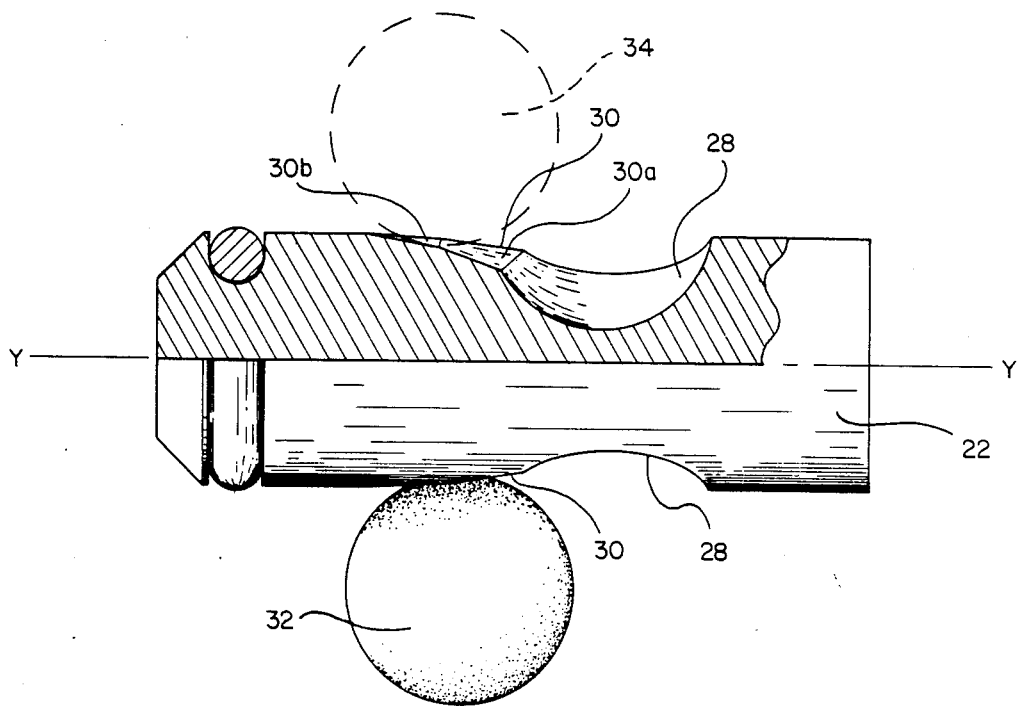
FIG. 2 is an enlarged fragmentary sectional view showing the varying sloped locking ramp formed on the locking rod of FIG. 1.

Viewing the forward locking portion 22 of the locking rod 20 it is seen that the same has formed thereon a pair of depressions 28. Extending forwardly from each depression 28 is a locking ramp 30. As seen in the drawings, locking ramp 30 is of a variable slope relative to the longitudinal axis Y—Y of the locking rod 20. While the slope of the ramp 30 varies between extreme longitudinal points therein, it is seen that the ramp is generally trough shaped in cross-section as its sides are generally turned up. In the case of the embodiment shown in FIG. 2, the variable sloped locking ramp 30 formed about opposite sides of the locking rod 20 includes a first angle ramp segment 30a and a second angle ramp segment 30b. Ramp segments 30a and 30b are disposed at a distinct angle with respect to each other and the axis of the locking rod Y—Y. In the embodiment illustrated in FIGS. 1 and 2, angle ramp segment 30a is disposed or directed at an angle of twenty degrees with respect to the longitudinal axis Y—Y of the locking rod. Angle ramp segment 30b is disposed and directed at a different angle, that is an angle of ten degrees with respect to the longitudinal axis Y—Y of the locking rod.

To effectuate locking tool holder 12 to the clamping unit 10, the clamping unit is provided with a pair of locking elements or balls 32 and 34. The locking balls 32 and 34 are confined about the forward locking portion of the locking rod 20 and lie in contact with that portion of the locking rod extending from the depression 28 through the locking ramp 30. In particular, the respective locking balls 32 and 34 are confined within apertures 16a and 16b of the stub or cannister 16 while still maintaining contact with the locking rod 20.

Turning to a brief discussion of the tool holder 12, it is appreciated that the same is of a conventional design and conforms basically to the structure and design disclosed in U.S. Pat. No. 4,708,040, and particularly illustrated in FIG. 1 therein. Briefly reviewing tool holder 12, it is seen that the same includes a forward end 40 that includes a tool receiving pocket 42 for receiving and holding a cutting tool 43 therein. A hollow tubular shank 44 extends rearwardly from the forward end 40. Shank 44 includes a pair of circumferentially spaced openings or apertures 46.

As illustrated in FIG. 1, tool holder 10 is designed to be inserted and held within the forward end portion of bore 14. In the secured position, locking balls 32 and 34 project through apertures 16a and 16b in the stub or cannister 16 and engage the lower rear wall portions of the apertures 46 formed in shank 44. The radial projection of balls 32 and 34 into engagement with apertures 46 of shank 44 result in a locking load being applied by the balls 32 and 34 against the rear wall portions of apertures 46. It is this loading that secures shank 44 of tool holder 12 within the clamping unit 10.

As seen in the drawings, locking rod 20 includes a fore and aft stroke since it can move from an unlocked position (extreme left-most position as viewed in FIG. 1), to a lock position which is shown in FIG. 1. It is seen that in the unlocked position, locking balls 32 and 34 seat within depressions 28. This allows shank 44 of tool holder 12 to be removed.

To securely lock the tool holder 12 within the bore 14 of support member 13, the springs 26 are effectively released causing the lock rod 20 to move left to right as viewed in FIG. 1. As the lock rod 20 moves left to right, the locking ramp 30 moves into engagement with the balls 32 and 34 and the ball tends to ride along the locking ramp 30 moving outwardly as the locking rod moves towards the lock position. As the locking balls 32 and 34 move along the locking ramp 30, they project outwardly through apertures 16a and 16b in the cannister or stub 16. A locking position is achieved once the locking balls securely seat within the apertures 46 of shank 44. As the locking balls 32 and 34 move up the varying sloped locking ramp 30, it is appreciated that the ramp 30 exerts an outwardly directed force against the balls 32 and 34, resulting in a radial or outwardly directed locking load which is actually urged against the shank. This outwardly directed or radial locking load is directed perpendicular from the longitudinal axis Y—Y of the locking rod 20.

Figure 3:
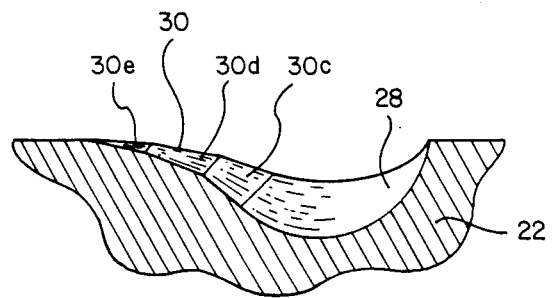
FIG. 3 is a fragmentary sectional view of an alternate design for the variable sloped locking ramp.
Figure 4:
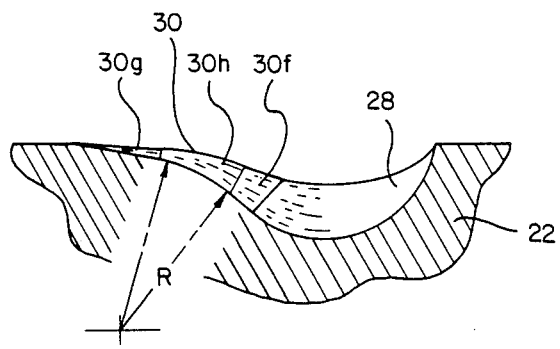
FIG. 4 is another fragmentary sectional view showing a second alternate design for the variable slope locking ramp.
Figure 5:
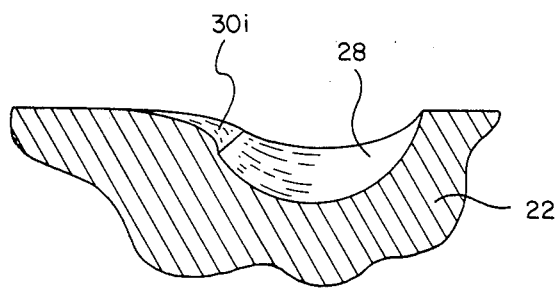
FIG. 5 is another fragmentary sectional view showing a third alternate design for the variable slope locking ramp.

With reference to FIGS. 3–5, alternate designs for the locking ramp 30 are shown. In all three designs, the locking ramp 30 is of a varying slope which results in the mechanical advantage being applied to the locking elements or balls varying as the balls or elements ride over the ramp 30. In the case of FIG. 3, it is seen that the slope of the angle ramp 30 is comprised of three distinct angle ramp segments 30c, 30d and 30e. It is contemplated that the separate angled ramp segment could vary from five to twenty-five degrees relative to the longitudinal axis of the locking rod.

Next, in FIG. 4, it is seen where the locking ramp 30 is made up of two spaced apart and distinct angled ramp segments 30f and 30g joined by an arcuate shaped inner run 30h that joins the extreme ramp segments in tangential fashion. Still, the slope of the angled ramp 30 changes from the initial ramp segment 30f, to the arcuate shaped run 30h, and finally to the extreme end ramp segment 30g. In the embodiment illustrated ramp segment 30f lies at a twenty degree angle while ramp segment 30g lies at a ten degree angle, both angles being relative to the longitudinal axis of the locking rod 20.

Finally in FIG. 5, there is shown an example of a varying sloped ramp that is configured such that the surface of the ramp is of a generally hyperbolic shape 30i.

From the foregoing specification and discussion, it is appreciated that because of the varying slope found on the locking ramp 30 that the mechanical advantage actually asserted against the balls 32 and 34 changes as the balls move from the initial point on the locking ramp 30 across the locking ramp to where the same terminates. The advantage of this design is that the clamping unit 10 and tool holder 12 in combination yield an ideal locking load. The design itself will effectively compensate for tolerances in structural design as well as differences in spring output. Essentially, by selectively varying the slope of the locking ramp 30, one is able to achieve a relatively constant resultant locking force irrespective of the position assumed by the locking rod 20 and irrespective of changes in force applied to the locking rod 20.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An clamping unit for receiving and holding a tool holder comprising:
   (a) a main body having a bore formed therein;
   (b) a locking rod movably mounted in the bore for movement between locked and unlocked positions;
   (c) at least one locking element contained adjacent the locking rod and movable from an unlocked position to a locked position where the same engages the tool holder and secures the tool holder to the main body;
   (d) variable load means engaged with the locking rod for applying a range of loading forces on the locking rod as the same moves between the unlocked and locked positions;
   (e) means associated with the locking rod for varying the mechanical advantage applied to the locking element as the locking rod moves between the locked and unlocked positions;
   (f) the means for varying the mechanical advantage applied to the locking element including a varying sloped locking ramp extending along a side portion of the lock rod and shaped such that the locking element moves therealong as the locking rod moves between the unlocked and locked positions; and
   (g) wherein the varying sloped ramp is configured so as to vary the mechanical advantage applied to the locking element throughout a substantial portion of the locking rod's stroke such that the radial locking load exerted by the locking element is relatively constant for a selected portion of the loading rod'-stroke.

2. The clamping unit of claim 1 wherein the varying sloped ramp includes at least two distinct ramps disposed at different angles relative to the longitudinal axis of the locking rod.

3. The clamping unit of claim 1 wherein the varying sloped ramp includes a generally arcuate shaped ramp section.

4. The clamping unit of claim 1 wherein the varying sloped ramp includes a pair of spaced apart flat ramp sections of different angles interconnected by a generally arcuate ramp section.

5. The clamping unit of claim 1 wherein the varying sloped ramp includes a generally hyperbolic shaped ramp section.

6. The clamping unit of claim 1 wherein the varying sloped ramp includes a ramp surface whose angle varies between 5 and 25 degrees relative to the longitudinal axis of the locking rod.

7. The clamping unit of claim 1 including a depression formed in the locking rod for receiving the locking element when the locking rod assumes the unlocked position; and wherein the varying sloped ramp extends from the depression along a side portion of the lock rod.

8. The clamping unit of claim 1 wherein the varying sloped ramp joins the depression and extends for a selected distance therefrom along a side portion of the lock rod first at a relatively steep angle with respect to the longitudinal axis of the lock rod and then at a more shallow angle for a selected distance such that the mechanical advantage exerted against the locking element as it moves along the ramp increases as the locking element moves away from the depression.

9. The clamping unit of claim 1 wherein the varying sloped ramp is configured such that a generally constant radial locking force is applied through the locking element over a significant run of the locking ramp irrespective of the force applied to the locking rod by the variable load means.

10. The clamping unit of claim 1 wherein a fixed cannister is interposed between the locking rod and the tool holder and includes an opening formed therein through which the locking element moves as the locking element moves between its unlocked and locked positions.

11. The clamping unit of claim 10 wherein the opening within the cannister confines the locking element such that the locking element moves radially with respect to the locking rod and is prevented from moving axially with the locking rod when the locking rod is moved from the unlocked position to the locked position.

12. An clamping unit for holding a tubular tool holder shank, comprising:
   (a) a tool support member having a forwardly facing surface and a bore intersecting the forwardly facing surface and extending rearwardly therefrom for receiving the tool holder shank;
   (b) a stub disposed in the bore and having a passageway formed therein, the stub being adapted to be received within the tubular tool holder shank;
   (c) a locking rod movably mounted within the passageway of the stub and having a stroke wherein the same moves between unlocked and locked positions;
   (d) first and second circumferentially spaced apertures formed in the stub and radially extending away from the wall of the bore and intersecting the passageway;
   (e) a pair of locking balls contained within the apertures and engaged with the locking rod;
   (f) means for moving the locking rod from the unlocked position to the locked position;
   (g) depression means formed in the locking rod for receiving the locking balls when the locking rod is in the unlocked position;
   (h) means associated with the locking rod for engaging the locking balls and moving the same from an unlocked position to a locked position and varying the mechanical advantage applied to the locking balls in the process wherein in the locked position the locking balls are forced against the hollow tool holder shank and holds the tool holder shank within the bore of the tool support member;

(i) the means for engaging the locking balls and moving the same from the unlocked to the locked position and varying the applied mechanical advantage including a variable sloped locking ramp that extends from the depression means along a side portion of the locking rod and serves to engage and urge the locking balls outwardly towards their locked position in response to the locking rod being moved from its unlocked position towards it locked position; and (j) wherein the variable sloped locking ramp is configured so as to vary the mechanical advantage applied to the looking balls throughout a substantial portion of the locking rod's stroke such that the radial locking load exerted by the ball is relatively constant for a selected portion of the lacking rod's stroke.

13. The clamping unit of claim 12 wherein the locking ramp is configured such that its surface is generally hyperbolically shaped over a substantial run.

14. The clamping unit of claim 12 wherein the varying sloped ramp includes a generally arcuate shaped ramp section.

15. The automatic clamping unit of claim 12 wherein the variable sloped locking ramp includes at least two separate and distinct sloped ramp segments.

16. The automatic clamping unit of claim 15 wherein the locking rod includes a longitudinal axis and wherein relative to the longitudinal axis of the locking rod the slope of the locking ramp decreases as it moves away from the depression means such that as the locking balls move from the depression means along the locking ramp the applied mechanical advantage increases.

17. A method of securing a clamping unit to the tubular shank of a tool holder comprising:

(a) inserting a tubular tool holder shank into a bore of a clamping unit;

(b) engaging at least one locking element of the clamping unit with a locking ramp forming a part of a locking rod;

(c) moving the locking rod from an unlocked position to a locked position and urging the locking element outwardly towards engagement with the shank of the tool holder; and (d) varying the mechanical advantage applied to the locking element by varying the angle of the locking ramp along its run such that the radial locking load exerted by the locking element is relatively constant for a selected portion of the locking rod's stroke.

18. The method of claim 17 wherein the locking rod is moved between the unlocked and locked positions by a variable force means and the force applied to the locking rod generally decreases as the locking rod moves from the unlocked position to the locked position; and wherein the step of varying the mechanical advantage includes the step of increasing the mechanical advantage applied to the locking element as the variable force applied to the locking rod decreases so as to provide a resultent radial locking load that is relatively constant for a certain stroke of the locking rod.

19. The method of claim 17 including varying the mechanical advantage applied to the locking element by engaging the locking element with at least two separate and distinct sloped ramp segments as the locking rod moves through its stroke in moving from the unlocked position to the locked position.

20. The method of claim 17 including the step of urging the locking element over a generally arcuate shaped locking ramp portion as the locking rod moves through a selected portion of its stroke so as to vary the mechanical advantage applied to the locking element.

21. The method of claim 17 including the step of confining the locking element within an opening formed in a stationary cannister interposed between the locking rod and the shank of the tool holder as the locking element moves radially outwardly towards engagement with the shank of the tool holder.

22. The method of claim 21 including confining the locking element such that is can only move radially with respect to the locking rod wherein as the locking rod moves from the unlocked to locked position the locking element is constrained to move radially through the opening in the stationary cannister.

23. An clamping unit for holding a tool holder shank having a locking surface, comprising:

(a) a clamping unit having a bore formed therein for receiving the shank of the tool holder;

(b) a lock rod movably mounted within the clamping unit and moveable back and forth between a locked and unlocked position;

(c) means engaged with the lock rod for applying a range of loading forces on the locking rod as the same moves between the unlocked and locked positions;

(d) at least one locking element disposed within the clamping unit and engageable with the lock rod and moveable from an unlocked position to a locked position where the locking element engages the locking surface of a tool holder shank, resulting in the tool holder being secured within the clamping unit; and (e) variable slope ramp means associated with the locking rod for engaging the locking element and varying the mechanical advantage applied to the locking element as the locking element moves from its unlocked position to its locked position so as to maintain a relatively constant radial locking load on the locking element for a selected portion of the locking rod's stroke.

24. The clamping unit of claim 23 including means for radially confining the locking element as the locking element is urged outwardly towards its locked position by the variable slope ramp means associated with the locking rod.

25. The clamping unit of claim 24 wherein the means for radially confine the locking element includes a stub extending around the locking rod and having an opening formed therein through which the locking element may move as it is urged outwardly by the variable slope ramp means into engagement with the locking surface of the tool holder shank.

26. The clamping unit of claim 25 wherein the locking element comprises two locking balls and wherein the variable slope ramp means includes two variable sloped ramps formed on the lock rod with each locking ball being engageable with a respective variable slope ramp.

27. The clamping unit of claim 23 including a depression formed in the locking rod for receiving the locking element when the locking rod assumes the unlocked positions; and wherein the variable slope ramp means extends from the depression along a side portion of the locked rod such that in moving from the unlocked to the locked position, the locking element moves from the depression up the variable slope ramp means as the locking rod is moved from its unlocked position towards the locked position.

* * * * *